(12) United States Patent
Abani et al.

(10) Patent No.: US 9,211,797 B2
(45) Date of Patent: Dec. 15, 2015

(54) COMBUSTION CHAMBER CONSTRUCTION WITH DUAL MIXING REGIONS FOR OPPOSED-PISTON ENGINES

(71) Applicant: Achates Power, Inc., San Diego, CA (US)

(72) Inventors: Neerav Abani, San Diego, CA (US); Ryan G. MacKenzie, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days.

(21) Appl. No.: 14/074,580

(22) Filed: Nov. 7, 2013

(65) Prior Publication Data

US 2015/0122227 A1    May 7, 2015

(51) Int. Cl.
| | |
|---|---|
| *F02B 25/08* | (2006.01) |
| *B60L 11/18* | (2006.01) |
| *F02B 23/06* | (2006.01) |
| *F01B 7/02* | (2006.01) |
| *F02B 75/28* | (2006.01) |
| *F02B 75/02* | (2006.01) |

(52) U.S. Cl.
CPC ............... *B60L 11/1801* (2013.01); *F01B 7/02* (2013.01); *F02B 23/066* (2013.01); *F02B 23/0621* (2013.01); *F02B 23/0624* (2013.01); *F02B 23/0663* (2013.01); *F02B 23/0678* (2013.01); *F02B 75/28* (2013.01); *B60L 2200/40* (2013.01); *F02B 2075/025* (2013.01)

(58) Field of Classification Search
CPC ........ F02F 3/28; F02B 75/28; F02B 23/0621; F02B 23/0624; F02B 23/066; F02B 23/0663; F02B 2075/025; F01B 7/02; B60L 11/1801; B60L 2200/40
USPC .................................. 123/51 R, 51 BD, 193.6
See application file for complete search history.

(56) References Cited

U.S. PATENT DOCUMENTS

| | | | |
|---|---|---|---|
| 665,475 | A | 1/1901 | Schweitzer |
| 667,298 | A | 2/1901 | Cunningham |
| 673,160 | A | 4/1901 | Diesel |
| 1,143,408 | A | 6/1915 | Kramer |
| 1,207,799 | A | 12/1916 | Scheller |
| 1,312,604 | A | 8/1919 | Wygodsky |

(Continued)

FOREIGN PATENT DOCUMENTS

| | | |
|---|---|---|
| BE | 388676 | 6/1932 |
| DE | 4335515 A1 | 4/1995 |

(Continued)

OTHER PUBLICATIONS

Pirault, J-P., et al, *Opposed Piston Engines: Evolution, Use, and Future Applications*, 2010, pp. 231-245.

(Continued)

*Primary Examiner* — Marguerite McMahon
(74) *Attorney, Agent, or Firm* — Terrance A. Meador (57) ABSTRACT

A combustion chamber construction for opposed-piston engines in which fuel is injected from two opposed injectors includes a dual mixing region construction with a respective mixing region for each injector and a coupling region between the two mixing regions through which the mixing regions communicate. In some aspects, the mixing regions are bulbous and are connected by a waist, or tunnel, region that is relatively narrower than the bulbous mixing chambers.

20 Claims, 5 Drawing Sheets

(56) References Cited

U.S. PATENT DOCUMENTS

| | | |
|---|---|---|
| 1,423,088 A | 7/1922 | Crossley et al. |
| 1,464,268 A | 8/1923 | Otto |
| 1,486,583 A | 3/1924 | Huskisson |
| 1,515,391 A | 11/1924 | Otto |
| 1,523,453 A | 1/1925 | Scott |
| 1,582,792 A | 4/1926 | Schultz |
| 1,644,954 A | 10/1927 | Shearer |
| 1,662,828 A | 3/1928 | Law |
| 1,808,664 A | 6/1931 | Koschka |
| 1,853,562 A | 4/1932 | Herr |
| 1,854,190 A | 4/1932 | Herr |
| 1,947,573 A | 2/1934 | Scott |
| 1,967,630 A | 7/1934 | Rusberg |
| 1,978,194 A | 10/1934 | Gray |
| 2,014,672 A | 9/1935 | Schmaljohann |
| 2,110,116 A | 3/1938 | Heraclio |
| 2,132,083 A | 10/1938 | Pateras |
| 2,173,081 A | 9/1939 | Barkeij |
| 2,196,429 A | 4/1940 | Siciliano |
| 2,337,245 A | 12/1943 | Jacklin |
| 2,393,085 A | 1/1946 | Wuehr |
| 2,396,429 A | 3/1946 | Krygsman |
| 2,440,310 A | 4/1948 | Thege |
| 2,463,418 A | 3/1949 | Pescara |
| 2,530,884 A | 11/1950 | Laraque |
| 2,607,328 A | 8/1952 | Jencick |
| 2,646,779 A | 7/1953 | Fiser |
| 2,682,862 A | 7/1954 | Camner |
| 2,699,156 A | 1/1955 | Karrow |
| 2,731,003 A | 1/1956 | Morris |
| 2,748,757 A | 6/1956 | Morris |
| 2,767,691 A | 10/1956 | Mengelkamp et al. |
| 2,805,654 A | 9/1957 | Jacklin |
| 2,853,983 A | 9/1958 | Sawle |
| 3,033,184 A | 5/1962 | Jackson |
| 3,117,566 A | 1/1964 | Venediger |
| 3,411,289 A | 11/1968 | Antonsen et al. |
| 4,090,479 A | 5/1978 | Kaye |
| 4,452,221 A | 6/1984 | Keating |
| 4,491,096 A | 1/1985 | Noguchi et al. |
| 4,700,672 A | 10/1987 | Baguena |
| 4,872,433 A | 10/1989 | Paul |
| 4,938,180 A | 7/1990 | King |
| 5,042,441 A | 8/1991 | Paul et al. |
| 5,083,530 A | 1/1992 | Rassey |
| 5,261,359 A | 11/1993 | Hall |
| 5,367,996 A | 11/1994 | Homil |
| 5,540,193 A | 7/1996 | Achten |
| 6,092,496 A | 7/2000 | Bhargava |
| 6,161,518 A | 12/2000 | Nakakita et al. |
| 6,170,443 B1 | 1/2001 | Hofbauer |
| 6,182,619 B1 | 2/2001 | Spitzer |
| 6,345,601 B1 | 2/2002 | Miyajima et al. |
| 6,443,122 B1 | 9/2002 | Denbratt et al. |
| 6,854,440 B2 | 2/2005 | Cathcart et al. |
| 6,874,489 B2 | 4/2005 | Yonekawa et al. |
| 6,928,997 B2 | 8/2005 | Yu |
| 6,997,158 B1 | 2/2006 | Liu |
| 7,210,448 B2 | 5/2007 | Stanton et al. |
| 7,284,524 B2 | 10/2007 | Matas et al. |
| 7,395,809 B2 | 7/2008 | Moller |
| 7,438,039 B2 | 10/2008 | Poola et al. |
| 7,597,084 B2 | 10/2009 | Vachon et al. |
| 8,050,844 B2 | 11/2011 | Hoard |
| 8,186,372 B2 | 5/2012 | Horiba et al. |
| 8,265,856 B2 | 9/2012 | Hoard |
| 8,308,038 B2 | 11/2012 | Tanaka et al. |
| 8,549,854 B2 | 10/2013 | Dion et al. |
| 8,677,950 B2 * | 3/2014 | Hofbauer .................... 123/51 R |
| 8,800,528 B2 | 8/2014 | Fuqua et al. |
| 8,820,294 B2 | 9/2014 | Fuqua et al. |
| 2005/0066929 A1 | 3/2005 | Liu |
| 2005/0150478 A1 | 7/2005 | Nomura |
| 2006/0124084 A1 | 6/2006 | Hofbauer et al. |
| 2006/0157003 A1 | 7/2006 | Lemke et al. |
| 2007/0272191 A1 | 11/2007 | Tsujimoto et al. |
| 2008/0006238 A1 | 1/2008 | Hofbauer et al. |
| 2008/0066724 A1 | 3/2008 | Klingebiel |
| 2008/0115771 A1 | 5/2008 | Elsbett |
| 2008/0127947 A1 | 6/2008 | Hofbauer et al. |
| 2009/0139485 A1 | 6/2009 | Pontoppidan |
| 2009/0159022 A1 | 6/2009 | Chu |
| 2009/0240419 A1 | 9/2009 | Hoard |
| 2010/0006061 A1 | 1/2010 | Shibata et al. |
| 2010/0107868 A1 | 5/2010 | Scharp et al. |
| 2010/0108044 A1 | 5/2010 | Liu |
| 2010/0224162 A1 | 9/2010 | Hofbauer |
| 2010/0282219 A1 | 11/2010 | Alonso |
| 2011/0041684 A1 | 2/2011 | Kortas et al. |
| 2011/0192143 A1 | 8/2011 | Andersson |
| 2011/0271932 A1 | 11/2011 | Fuqua et al. |
| 2011/0289916 A1 | 12/2011 | Dion et al. |
| 2012/0029791 A1 | 2/2012 | Hoard |
| 2012/0073526 A1 | 3/2012 | Dion et al. |
| 2012/0073541 A1 | 3/2012 | Fuqua et al. |
| 2012/0125298 A1 | 5/2012 | Lemke et al. |
| 2012/0192831 A1 | 8/2012 | Tusinean |
| 2012/0234285 A1 | 9/2012 | Venugopal et al. |
| 2012/0285418 A1 | 11/2012 | Elsbett et al. |
| 2013/0014718 A1 | 1/2013 | Shen et al. |
| 2013/0036999 A1 | 2/2013 | Levy et al. |
| 2013/0104848 A1 | 5/2013 | Klyza et al. |
| 2013/0213342 A1 | 8/2013 | Burton et al. |
| 2013/0297182 A1 | 11/2013 | Vincenzi et al. |
| 2014/0014063 A1 | 1/2014 | Redon |
| 2015/0033736 A1 | 2/2015 | Kalebjian et al. |

FOREIGN PATENT DOCUMENTS

| | | |
|---|---|---|
| DE | 19651175 A1 | 6/1998 |
| DE | 10141888 A1 | 4/2003 |
| DE | 102004010361 A1 | 12/2004 |
| DE | 102006055251 A1 | 5/2008 |
| DE | 102008055911 A1 | 5/2010 |
| EP | 2077382 A1 | 8/2009 |
| FR | 848994 A | 6/1939 |
| FR | 50 349 | 3/1940 |
| GB | 1914-9948 A | 0/1915 |
| GB | 320 439 | 4/1929 |
| GB | 531366 | 7/1939 |
| GB | 510542 A | 8/1939 |
| GB | 527873 A | 10/1940 |
| GB | 540658 A | 10/1941 |
| GB | 552758 A | 4/1943 |
| GB | 562 343 | 10/1943 |
| GB | 885281 A | 12/1961 |
| GB | 2493260 | 1/2013 |
| JP | 352004909 A | 1/1977 |
| JP | 2005-500450 A | 1/2005 |
| JP | 2009-138718 A | 6/2009 |
| SU | 1216394 A1 | 3/1986 |
| WO | WO-99/58830 A | 11/1999 |
| WO | WO-01/25618 A1 | 4/2001 |
| WO | WO-02/48524 A1 | 6/2002 |
| WO | WO-2006/105390 A1 | 10/2006 |
| WO | WO 2007/006469 A2 | 1/2007 |
| WO | WO 2009/061873 A1 | 5/2009 |
| WO | WO-2011/061191 A1 | 5/2011 |
| WO | WO 2011/139332 A1 | 11/2011 |
| WO | WO-2012/023970 A2 | 2/2012 |
| WO | WO 2012/023975 A1 | 2/2012 |
| WO | WO 2012/158756 A1 | 11/2012 |
| WO | WO-2013/013756 A1 | 1/2013 |
| WO | WO-2013/062921 A1 | 5/2013 |
| WO | WO-2013/126347 A1 | 8/2013 |
| WO | WO-2014/162143 A1 | 10/2014 |

OTHER PUBLICATIONS

International Search Report/Written Opinion for PCT/US2011/001429, mailed Mar. 12, 2012.

International Search Report/Written Opinion for PCT/ US2012/061381, mailed Apr. 12, 2013.

International Search Report/Written Opinion for PCT/US2013/026737, mailed Jun. 26, 2013.

(56) References Cited

OTHER PUBLICATIONS

International Search Report/Written Opinion for PCT/US2013/060429, mailed Nov. 18, 2013.
International Search Report/Written Opinion for PCT/US2014/026670, mailed Jul. 10, 2014.
International Search Report/Written Opinion for PCT/US2014/049076, mailed Jan. 5, 2015.
International Search Report/Written Opinion for PCT/US2014/060425, mailed Jan. 8, 2015.
Hofbauer, P., *SAE Publication 2005-01-1548*, "Opposed Piston Opposed Cylinder (opoc) Engine for Military Ground Vehicles," Apr. 2005.
Franke, M., *SAE Publication 2006-01-0277*, "Opposed Piston Opposed Cylinder (opoc) 450 Engine: Performance Development by CAE Simulations and Testing," M. Franke, et al, Apr. 2006.
Hirsch, N.R., et al, *SAE Publication 2006-01-0926*, "Advanced Opposed Piston Two-stroke Diesel Demonstrator," Apr. 2006.
International Search Report/Written Opinion for PCT/ US2011/000692, mailed Aug. 18, 2011.
International Search Report/Written Opinion for PCT/ US2011/001436, mailed Nov. 3, 2011.
International Search Report/Written Opinion for PCT/ US2012/038061, mailed May 16, 2012.

* cited by examiner

COMBUSTION CHAMBER CONSTRUCTION WITH DUAL MIXING REGIONS FOR OPPOSED-PISTON ENGINES

RELATED APPLICATIONS

This application is related to: U.S. patent application Ser. No. 14/026,931, filed Sep. 13, 2013, which was published as US 2014/0014063 A1 on 16 Jan. 2014; U.S. patent application Ser. No. 13/843,686, filed Mar. 15, 2013, which was published as US 2013/0213342 A1 on 22 Aug. 2013; U.S. patent application Ser. No. 13/066,589, filed Apr. 18, 2011, which was published as US 2011/0271932 on 10 Nov. 2011, now U.S. Pat. No. 8,800,528 B2, which issued on 12 Aug. 2014; and, PCT application US2012/038061, filed 16 May 2012 which was published as WO 2012/158765 on 22 Nov. 2012.

BACKGROUND

The field includes opposed-piston engines in which a combustion chamber is defined between end surfaces of pistons disposed in opposition in the bore of a ported cylinder. More particularly, the field includes opposed-piston engines with combustion chamber constructions that promote complex, turbulent bulk motion in charge air admitted into the cylinder.

A two-stroke cycle engine is an internal combustion engine that completes a cycle of operation with a single complete rotation of a crankshaft and two strokes of a piston connected to the crankshaft. One example of a two-stroke cycle engine is an opposed-piston engine in which a pair of pistons is disposed in opposition in the bore of a cylinder for reciprocating movement in opposing directions. Per FIG. 1, an opposed-piston engine includes at least one cylinder 10 with a bore 12 and longitudinally-displaced intake and exhaust ports 14 and 16 machined or formed therein. (In some aspects, when the term "cylinder" is used in this application, it refers also to a cylinder liner.) One or more fuel injectors 17 are secured in injector ports (ports where injectors are positioned) that open through the side surface of the cylinder. Two pistons 20, 22 according to the prior art are disposed in the bore 12 with their end surfaces 20e, 22e in opposition to each other. For convenience, the piston 20 is denominated as the "intake" piston because of its proximity to the intake port 14. Similarly, the piston 22 is denominated as the "exhaust" piston because of its proximity to the exhaust port 16.

Figure 1:
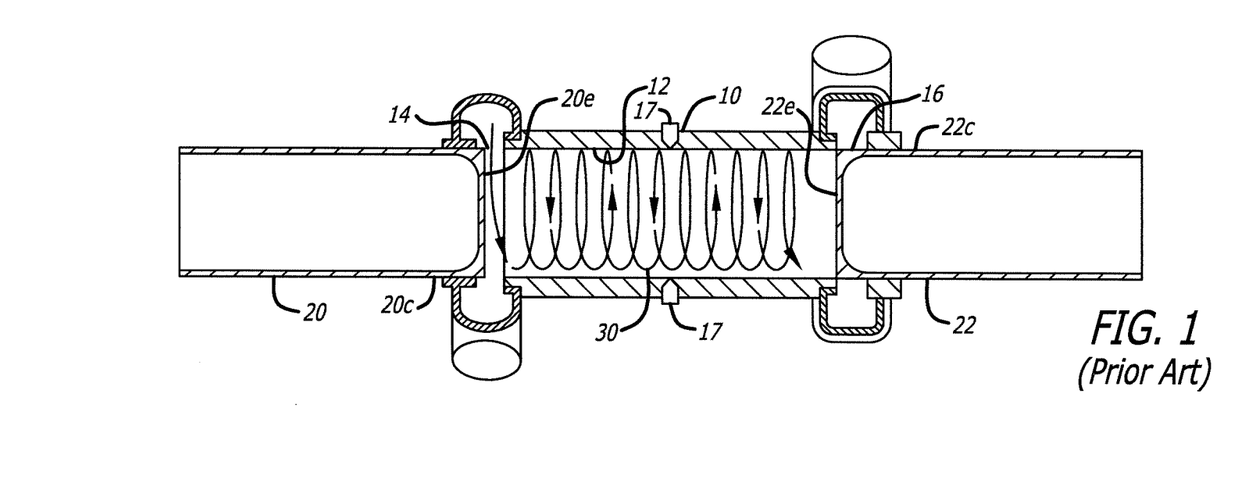
FIG. 1 is a side sectional partially schematic drawing of a cylinder of an opposed-piston engine with prior art opposed pistons near respective bottom center locations, and is appropriately labeled "Prior Art".

Operation of an opposed-piston engine with one or more ported cylinders (cylinders with longitudinally-spaced intake and exhaust ports formed in a sidewall thereof) such as the cylinder 10 is well understood. In this regard, a power stroke commences when, in response to combustion, the opposed pistons move away from respective top center (TC) positions where they are at their innermost positions in the cylinder 10. While moving from TC, the pistons keep their associated ports closed until they approach respective bottom center (BC) positions where they are at their outermost positions in the cylinder. The pistons may move in phase so that the intake and exhaust ports 14, 16 open and close in unison. Alternatively, one piston may lead the other in phase, in which case the intake and exhaust ports have different opening and closing times.

For example, presume the exhaust piston leads the intake piston and the phase offset causes the pistons to move around their BC positions in a sequence in which the exhaust port 16 opens as the exhaust piston 22 moves through BC while the intake port 14 is still closed so that combustion gasses start to flow out of the exhaust port 16. As the pistons continue moving away from each other, the intake piston 20 moves through BC causing the intake port 14 to open while the exhaust port 16 is still open. As the pistons reverse direction, the exhaust port closes first, followed by the intake port.

A compression stroke commences when the pistons reverse direction and move from BC toward TC positions. As the pistons move away from their BC positions their movements are phased such that the port openings overlap to promote scavenging. In scavenging, a charge of pressurized air is forced into the cylinder 10 through the open intake port 14, driving exhaust gasses out of the cylinder through the open exhaust port 16. Typically, the charge of fresh air is swirled as it passes through ramped openings of the intake port 14. With reference to FIG. 1, the swirling motion (or simply, "swirl") is a generally helical movement of charge air that circulates around the cylinder's longitudinal axis and moves longitudinally through the bore of the cylinder 10. Per FIG. 2, as the pistons 20, 22 continue moving toward TC, the ports close and the swirling charge air remaining in the cylinder is compressed between the end surfaces 20e and 22e. As the pistons near their respective TC locations in the cylinder bore, fuel 40 is injected into the compressed charge air 30, between the end surfaces 20e, 22e of the pistons. As injection continues, the swirling mixture of air and fuel is increasingly compressed in a combustion chamber 32 defined between the end surfaces 20e and 22e. When the mixture reaches an ignition temperature, fuel ignites in the combustion chamber, initiating another power stroke by driving the pistons apart toward their respective BC locations.

The geometries of the intake port openings and the cylinder of an opposed-piston engine provide a very effective platform for generation of a strong bulk fluid motion of the charge air in the form of swirl that promotes both removal of exhaust gasses (scavenging) and the movement of fuel to air (air/fuel mixing). However, charge air motion that is dominated by swirl can produce undesirable effects during combustion. For example, during combustion in a cylindrical combustion chamber defined between flat piston end surfaces, swirl pushes the flame toward the cylinder bore, causing heat loss to the (relatively) cooler cylinder wall. The higher velocity vectors of swirl occur near the cylinder wall, which provides the worst scenario for heat losses: high temperature gas with velocity that transfers heat to the cylinder wall and lowers the thermal efficiency of the engine. The peripheries of the piston end surfaces also receive a relatively high heat load, which causes formation of a solid residue of oil coke that remains in the piston/cylinder interface and in the ring grooves when lubricating oil breaks down at high engine temperatures.

Accordingly, it is desirable to maintain the benefits provided by swirl while mitigating its undesirable effects as combustion begins. At the same time, it is desirable to continue to promote turbulence in the charge air motion in order to encourage a homogeneous mixture of fuel and air, which in turn, produces more complete and more uniform ignition than would otherwise occur.

These advantages have been achieved in two-stroke opposed-piston engines by provision of shapes in the opposing end surfaces of the pistons that generate additional components of bulk air turbulence in the combustion chamber. In this regard, certain opposed-piston combustion chamber constructions include surfaces that generate squish flow from the periphery of the combustion chamber in a radial direction of the cylinder toward the cylinder's axis. In some aspects, squish flow can be inwardly directed as when a high pressure region at the peripheries of the piston end surfaces causes charge air to flow to a lower-pressure region generated by a bowl formed in at least one piston end surface.

U.S. Pat. No. 1,523,453 describes a pair of opposed pistons having depressions formed in their heads which form a pear-shaped combustion chamber when the pistons are adjacent each other. The larger end of the chamber is substantially closed and the smaller end is open to permit injection of fuel into the chamber by an injection valve in the cylinder wall. The pear-like shape of the combustion chamber produces two desirable effects. First, it accommodates a single, cone-shaped spray of injected fuel that is proximate to, but does not contact, the end surfaces of the pistons. Second, as the pistons reciprocate, the shape moves air in such a manner as to promote good air/fuel mixing and effective combustion.

A number of recently-disclosed opposed-piston designs have been directed to generation of tumble in bulk motion of charge air. For example, related U.S. application Ser. No. 13/066,589 describes formation of an ellipsoidally-shaped combustion chamber between projecting curved ridges in the adjacent end surfaces of opposed pistons. The curved ridges are identical, but mutually rotated by 180°. The end surfaces interact with swirl and squish flows to produce tumble at the narrow ends of the combustion chamber, near the bore surface of the cylinder. The wider central portion of the combustion chamber preserves swirl. Related application Ser. No. 13/843,686 describes an improvement to this mutually-inverted ridge configuration in which the central portion of the combustion chamber has a pronounced spherical aspect that preserves more swirl than the mainly ellipsoidal shape. An ellipsoidally-shaped combustion chamber formed between opposed pistons having non-identical, but complementary end surface shapes is described in the related PCT application. In this construction, a concave bowl is formed in one end surface. The opposing end surface has a convex projection in which a bilaterally-tapered, diametrical cleft is formed between mirrored, continuously curved ridges. When the end surfaces are adjacent, the convex projection is received in the concave bowl and the combustion chamber is defined principally by the cleft. Bordering squish regions are formed on either side of the chamber by opposing convex/concave end surface portions.

In related application Ser. No. 14/026,931, a combustion chamber for an opposed-piston engine has a bowl/mirrored ridge construction that distributes the combustion chamber volume between a central, largely spherical (or spheroidal) volume which holds most of the heat of combustion and lateral spray clearance channels that are mutually aligned along an injection axis and disposed on respective sides of the central volume. The bowl construction is provided on the end surface of one piston of a pair of opposed pistons and the mirrored ridge construction is provided on the end surface of the other piston of the pair.

The combustion chamber shapes described in the related applications cause swirling charge air to interact with contoured piston end surfaces to produce turbulent bulk air motion that includes elements of swirl, squish, and tumble. The combustion chambers have elongated shapes with tapered ends that cause the air motion elements to be oriented with respect to a direction in which fuel is injected. In many of these cases, fuel is injected from two diametrically or near diametrically opposed injectors with nozzles positioned at the tapered ends. Each injector injects fuel through multiple nozzle holes, which produces a cone-like spray pattern with multiple, diverging plumes. It is desirable that the spray patterns interact with the turbulently-moving charge air in such a way as to create an optimal mixture of air and fuel for effective combustion. For this and other objectives, the shape of the combustion chamber should promote the following desirable results.

The combustion chamber shape of an opposed-piston engine should minimize the interaction of the plumes in each injected spray pattern, as well as interactions between the opposing spray patterns as they approach each other. Air/fuel mixing should be maximized for the fuel injected by each injector. The residence time of flame on the piston end surfaces should be minimized. The elements of turbulent air motion should be felt by the multiple plumes issuing from each injector.

SUMMARY

A combustion chamber for an opposed-piston engine that achieves these results includes a dual mixing region construction with a respective mixing region for each injector and a coupling region between the two mixing regions through which the mixing regions communicate. In some aspects, the mixing regions are spherically-shaped, or near spherically-shaped, chambers connected by a waist, or tunnel, region that is relatively narrower than the mixing chambers.

From another aspect, these results are achieved by piston constructions that form a combustion chamber with separated bulbous, or orbicular, portions that are aligned diametrically with respect to a cylinder bore in which the pistons are disposed and that are joined by a waist, or tunnel, that is relatively narrower than the bulbous portions.

The spherical (or bulbous) shapes of the mixing volumes provide ample room for wider spray angles, support turbulent air motion in each mixing volume, increase air/fuel mixing for each spray pattern, and minimize interactions within each spray pattern and between the opposing spray patterns. The connecting waist volume supports circulation of charge air between the mixing volumes, which adds to the turbulence of the bulk air motion and reduces the combustion chamber surface exposed to flame.

In some aspects of one construction, paired opposing pistons have identical ridged contours formed in their end surfaces, such that a combustion chamber is formed between projecting curved ridges when the end surfaces are adjacent. In aspects of another construction a generally concave bowl is formed in the end surface of a first piston so as to receive a generally convex protrusion of the end surface of a second piston when the pistons are adjacent. A diametrical cleft in the shape of the combustion chamber is formed in the convex protrusion. When the end surfaces are adjacent, the concave bowl covers the cleft, thereby containing the moving charge air, the injected fuel, and the resulting combustion in the combustion chamber.

BRIEF DESCRIPTION OF THE DRAWINGS

The below-described drawings are intended to illustrate examples discussed in the following description; they are not necessarily to scale.

3B is a side sectional view of the crown of the piston taken on a plane that is orthogonal to an injection axis of the combustion chamber and that contains the piston's longitudinal axis.

DETAILED DESCRIPTION OF THE PREFERRED EMBODIMENTS

Figure 2:
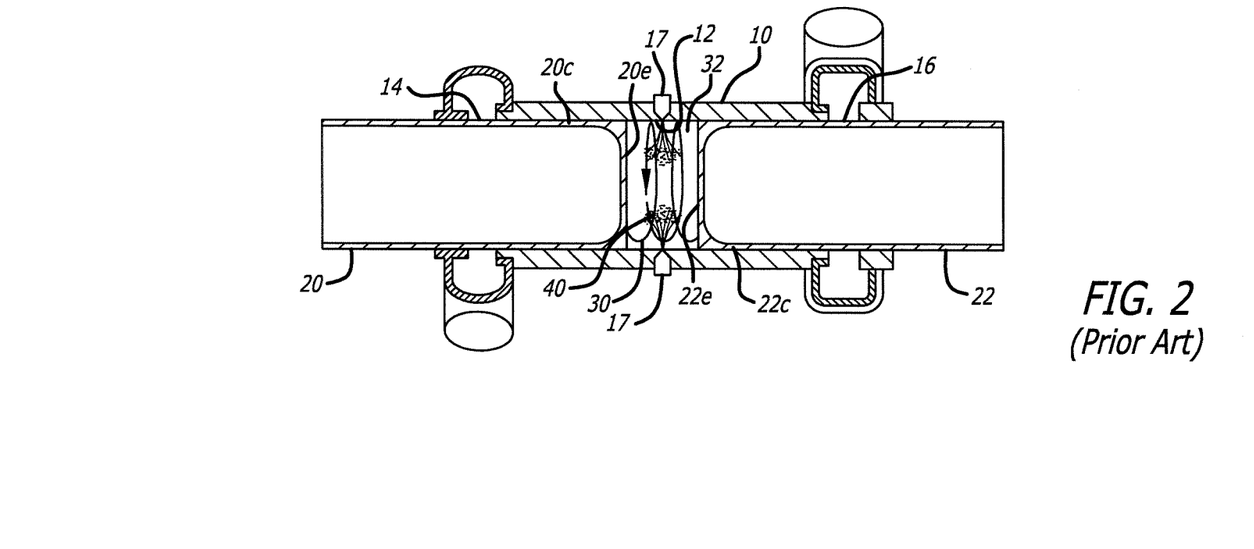
FIG. 2 is a side sectional partially schematic drawing of the cylinder of FIG. 1 with the prior art opposed pistons near respective top center locations where flat end surfaces of the pistons define a combustion chamber, and is appropriately labeled "Prior Art".

Using the engine of FIGS. 1 and 2 as a basis, an opposed-piston engine includes at least one cylinder with a bore and longitudinally-separated exhaust and intake ports formed or machined in the sidewall of the cylinder. A pair of pistons is disposed in opposition in the bore of the cylinder, and a combustion chamber is defined between the opposing end surfaces of the pistons as the pistons move through respective TC positions.

A combustion chamber construction for such an opposed-piston engine is based on modifications of the piston end surfaces. The combustion chamber construction includes a cavity or space in the bore that is defined by the opposing end surfaces of the pistons. In plan, the combustion chamber has an elongated continuously-curved shape with separate, spherically-shaped, or bulbous, mixing regions aligned with an injection axis and connected by a narrowed coupling region and injection ports located on the injection axis through which fuel is injected into the mixing regions.

The construction to be described produces a bulk fluid motion in the combustion chamber due to the interaction of swirling charge air in the cylinder with the piston end surfaces as the pistons move towards TC. During operation of the engine, as the pistons approach TC, one or more squish zones direct flows of compressed air (called "squish flows") into the combustion chamber. The resulting bulk fluid motion in the combustion chamber includes elements of swirl, squish, and tumble.

In the following descriptions, "fuel" is any fuel that can be used in an opposed-piston engine. The fuel may be a relatively homogeneous composition, or a blend. For example, the fuel may be a gaseous fuel, a liquid fuel, or any other fuel ignitable by compression ignition. The descriptions contemplate injection of fuel into a compressed gas in a combustion chamber when opposed pistons are at or near TC locations. In some aspects, injection may occur earlier in the compression stroke. The gas is preferably pressurized ambient air; however, it may include other components such as exhaust gases or other diluents. In any such case, the gas is referred to as "charge air."

Figure 3A:
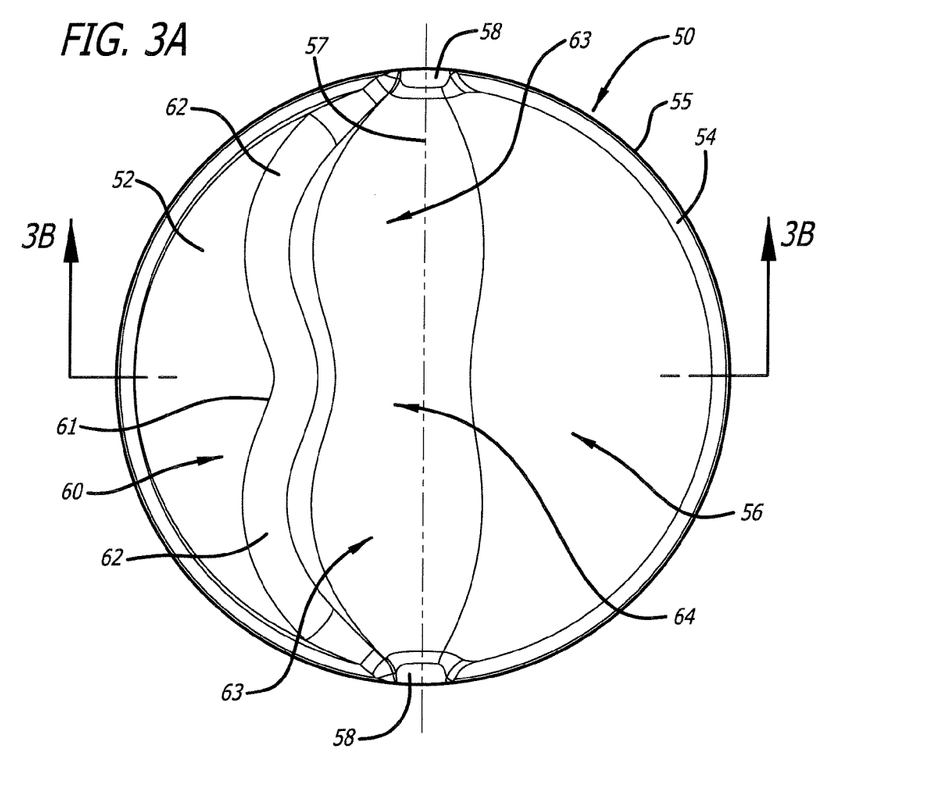
FIG. 3A is an end view of the of a piston for an opposed-piston engine having an end surface shape that forms a combustion chamber with dual mixing regions in cooperation with an opposing, identically shaped piston end surface. FIG.
Figure 3B:
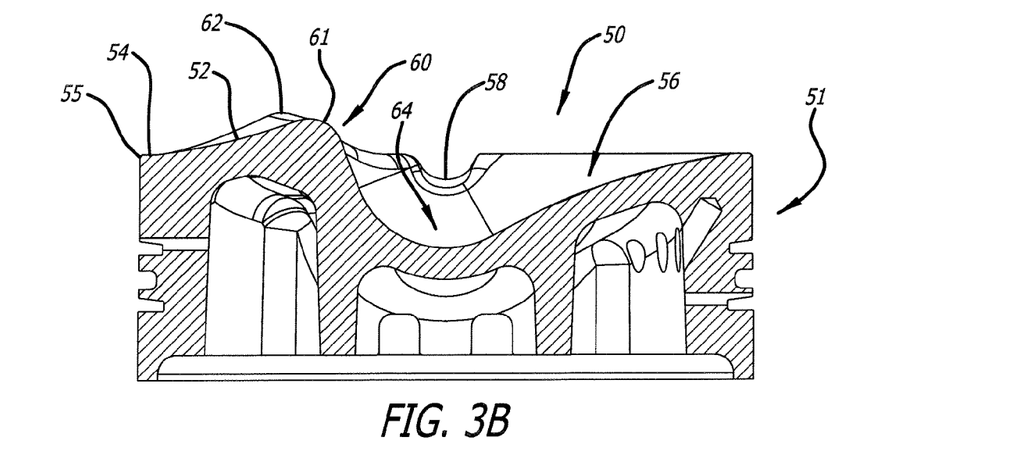
Figure 4:
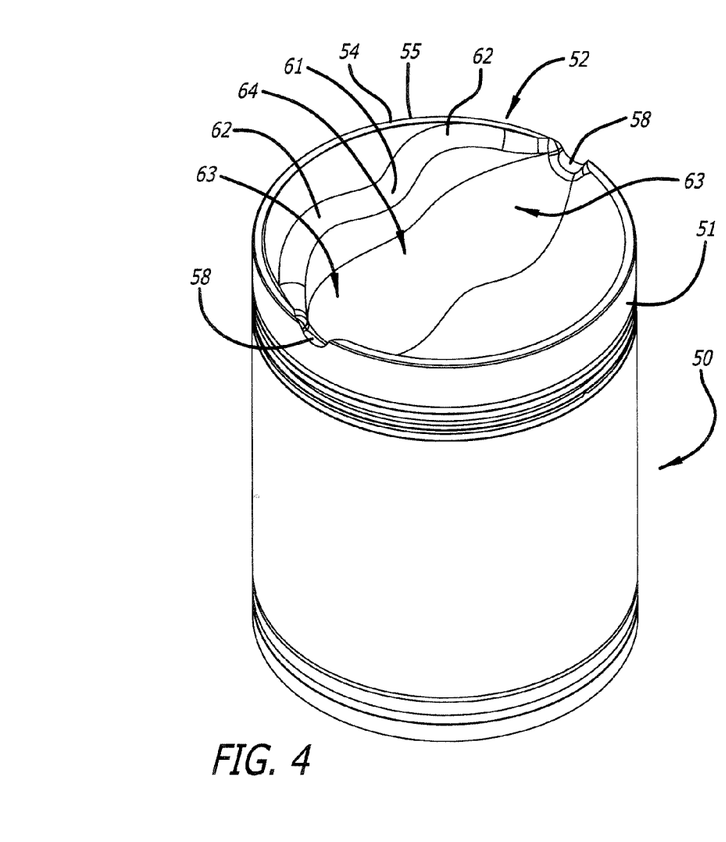
FIG. 4 is an isometric view of a piston with an end surface construction according to FIGS. 3A and 3B.

First Construction:

FIGS. 3A, 3B and 4 illustrate a first construction for a combustion chamber defined by complementary end surface structures of opposed pistons disposed in a ported cylinder of an opposed piston engine. The first combustion chamber construction is bordered by squish surface areas that create a relatively strong squish flow motion. The end surfaces of the opposed pistons have identical, generally symmetrical contours; when placed in the bore of a cylinder the pistons are rotationally oriented to place complementary features of the end surfaces in opposition in order to form the combustion chamber.

The end surface structure of each piston has a circumferential, peripheral edge that transitions to an annular surface on the inside of the edge. A recessed combustion chamber portion runs diametrically within the annular surface surrounding a combustion chamber half that is bordered by a continuously curved ridge. The ridge protrudes outwardly in part from a plane including the annular surface. The recess and the ridge define substantially one half of the combustion chamber. The end surface structure is provided on both pistons and the pistons are disposed in the bore of a ported cylinder with their end surfaces oriented so as to orient the ridges in mirrored opposition along a plane of symmetry containing an injection axis and an axis of the cylinder bore in which the pistons are disposed.

The structures of the piston end surfaces that define the first construction are essentially identical to each other; accordingly, the piston 50 shown in FIGS. 3A, 3B, and 4 represents both the intake piston and exhaust piston. As per these figures, the piston 50 has a crown 51 with an end surface 52. The outer edge of a flat, annular area 54 centered on the longitudinal axis of the piston 50 defines a circumferential, peripheral edge 55 of the end surface 52. A recess 56 is formed inside of the annular area 54. An injection axis 57 runs diametrically between notches 58 that cut through the annular area 54 at diametrically-opposed locations. The recess 56 transitions to a continuously-curved ridge 60 that extends between opposite locations on the periphery 55 and protrudes outwardly from a plane that contains the annular area 54. The ridge 60 includes a central portion 61 that curves inwardly (away from the periphery 55) and transitions to mixing region portions 62 laterally flanking the central portion 61 that curve outwardly (toward the periphery 55). The outward curvature of each mixing region portion 62 transitions to an inward curvature that bends toward the injection axis 57 until the portion 62 meets the annular area 54. Together, the recess 56 and ridge 60 form a surface having the shape of half a peanut shell with a longitudinal disposition along the injection axis 57. This shape includes mixing region portions 63 that transition inwardly along the injection axis 57 to a waist portion 64.

Figure 5:
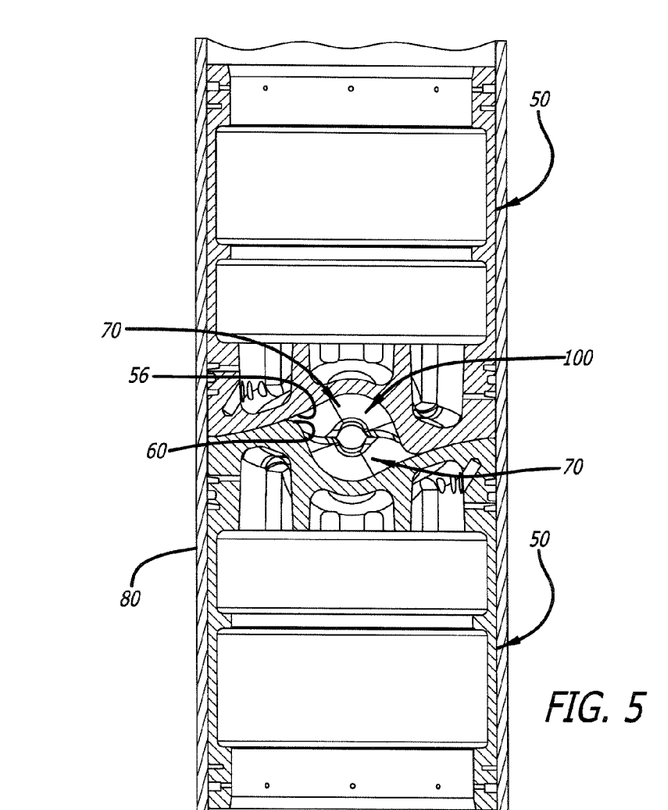
FIG. 5 is a sectional drawing of a cylinder of an opposed-piston engine showing a pair of opposed pistons according to FIG. 4 at or near top center (TC) positions where their opposing end surfaces form a combustion chamber with dual mixing regions.

Referring now to FIG. 5, two pistons 50 having end surfaces shaped as per FIGS. 3A and 3B are shown disposed in opposition, at or near respective TC locations within a ported cylinder 80. The pistons are rotationally oriented in the bore of the cylinder 80 so as to align the end surfaces in complement; that is to say, the curved ridge 60 of one piston faces the recess 56 of the other piston. Swirling charge air is increasingly compressed between the end surfaces 52. As the pistons 50 approach TC, compressed air flows from the peripheries of the end surfaces through squish channels defined between the ridge/recess pairs 60, 56. These squish airflows 70 flow into a combustion chamber 100.

Figure 6:
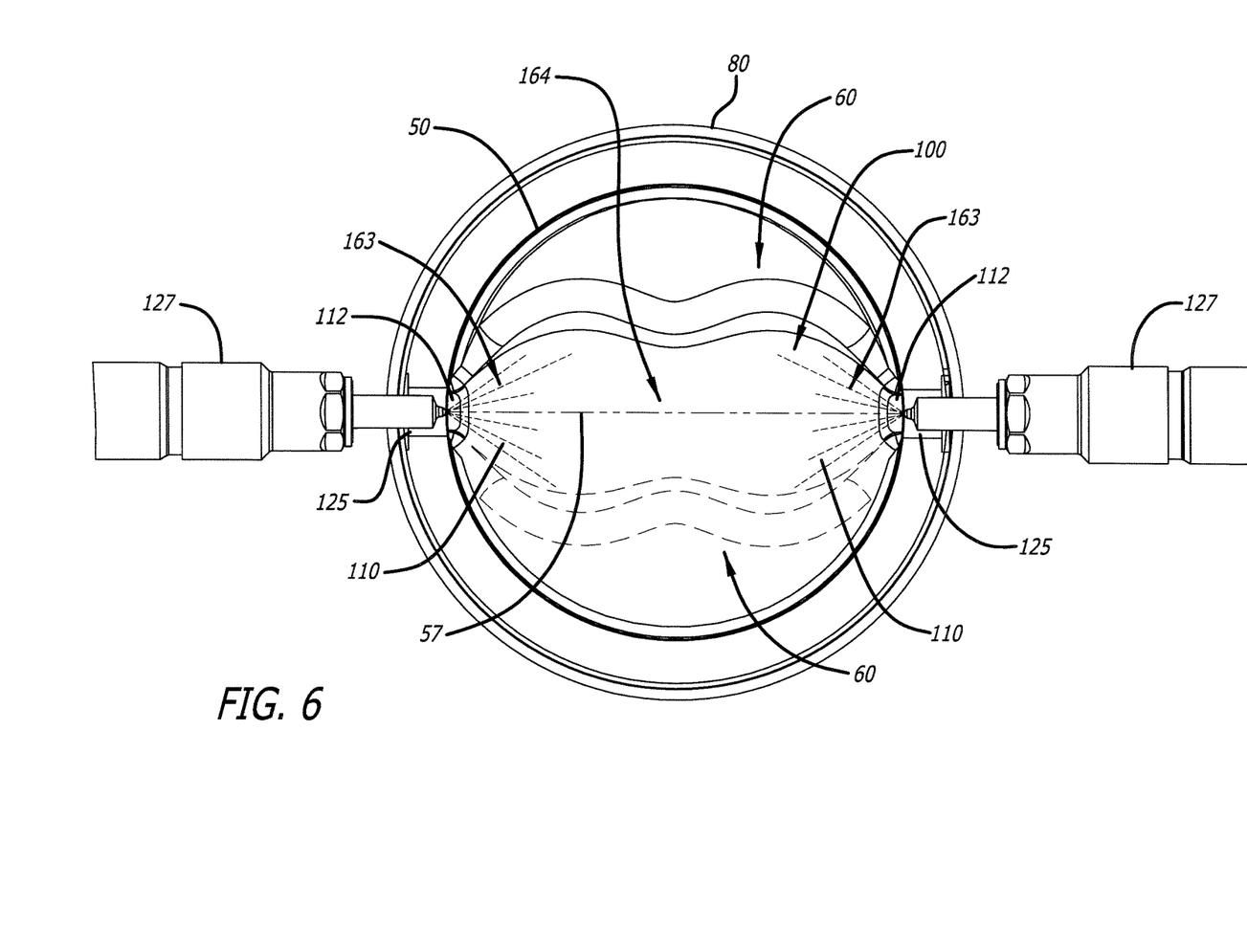
FIG. 6 is a schematic drawing of the dual mixing region combustion chamber according to FIG. 5 near the time of combustion.

As per FIG. 6, the combustion chamber 100 defined between the end surfaces of the pistons has a peanut-shell shaped cavity. The flanking portions of the ridges 60 and the mixing portions 63 define mixing regions 163 as spherical, or bulbous, volumes and the central portions of the ridges 60 and the waist portion 64 define a waist, a volume in the coupling region 164 that is narrower than the bulbous volumes. Viewed from another aspect, the combustion chamber 100 has an injection axis 57, dual mixing regions 163 disposed along the injection axis 57, a narrower coupling region, or waist, 164 aligned with the injection axis 57 and disposed between the mixing regions 163. The mixing regions 163 communicate through the coupling region 164. Fuel 110 is injected into the mixing regions 163 through injection ports 112 located on the injection axis 57 and formed by opposing notches (58 in FIG. 4).

Fuel 110 is injected into the combustion chamber, along the axis 57, through injector ports 125 in the cylinder 80 into the combustion chamber 100 by opposed injectors 127. The fuel 110 from each injector 127 travels into an adjacent mixing region 163, where it encounters turbulently moving charge air. The bulk air motion in each mixing region 163 includes elements of swirl and squish. As described in the related applications, the swirl and squish elements interact with the surface contours in the combustion chamber 100 to produce tumble flows. As injection continues, the swirling mixtures of air and fuel are increasingly compressed in the combustion chamber 100. The coupling region 164 permits the resulting air/fuel mixtures to pass between the mixing regions 163 with minimal contact with the surfaces forming the combustion chamber 100. When the mixture reaches an ignition temperature, fuel ignites in the combustion chamber 100.

Figure 7:
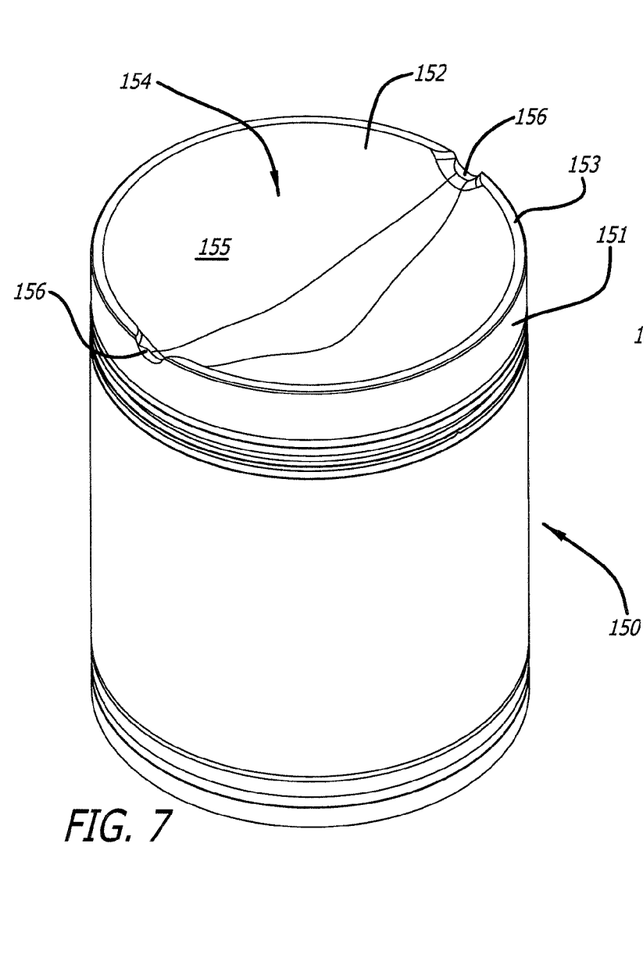
FIGS. 7 and 8 are isometric views of a pair of opposed pistons with end surfaces having complementary shapes that form a combustion chamber with dual mixing regions.
Figure 8:
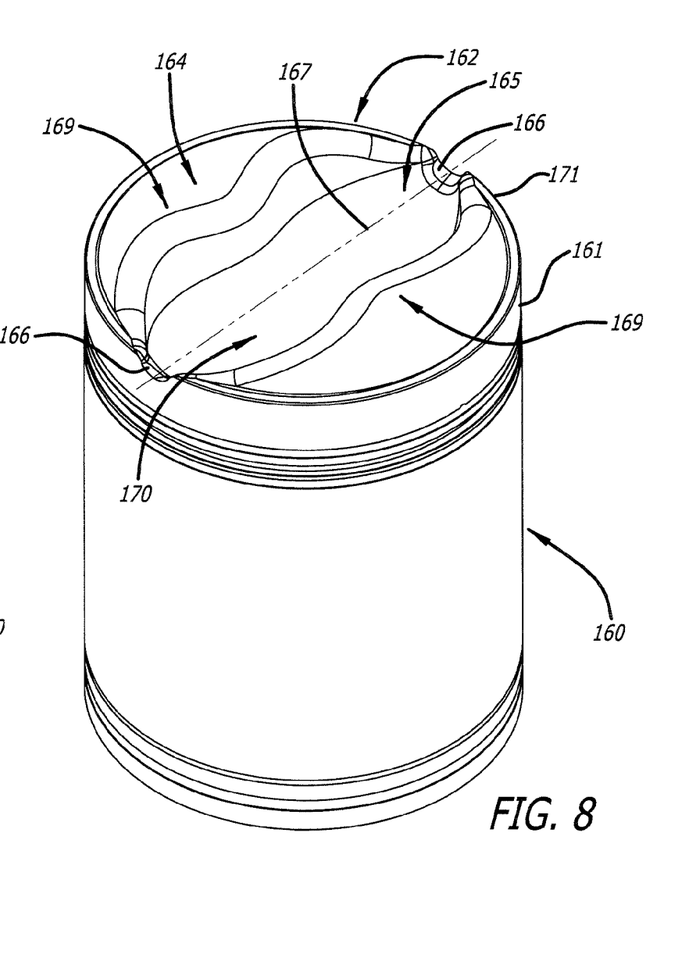

Second Construction:

FIGS. 7 and 8 illustrate a pair of pistons 150 and 160 with complementary piston end surface structures for defining a combustion chamber having substantially the same shape as the combustion chamber 100 of the previous construction. The piston 150 has a crown 151 with an end surface 152 including a peripheral edge 153 surrounding a bowl 154 with a concave surface 155 curving away from the periphery 153 toward the interior of the piston 150. Opposed notches 156 formed in the end surface 152 open through the periphery 153 into the bowl 154. The other piston 160 has a crown 161 with an end surface 162 including a peripheral edge 171 surrounding a convex portion 164 protruding outwardly from the interior of the piston 160. An elongated cleft 165 extending in a diametrical direction of the piston 160 is formed in the convex portion 164. Opposed notches 166 aligned along an injection axis 167 and formed in the end surface 162 open through the peripheral edge 171 into respective ends of the cleft 165. As per the description to follow, the concave bowl 154 receives the convex portion 164 and covers the elongated cleft 165 to define a combustion chamber therewith.

The cleft 165 has an elongated, bilaterally symmetrical shape referenced to a plane of symmetry that contains the injection axis 167 and the longitudinal axis of the piston 160. The bilaterally symmetrical shape is defined between mirrored ridges 169 protruding outwardly from the end surface of the piston 160. Viewing the end surface 162 in plan, each ridge 169 has the shape of the ridge 60 seen in FIG. 3A. The ridges 169 transition downwardly to a recess 170. Together, the ridges 169 and the recess 170 form the cleft 165 substantially in the peanut-shell shape of the combustion chamber 100 shown in FIG. 6.

Although principles of piston and combustion chamber constructions have been described with reference to presently preferred embodiments, it should be understood that various modifications can be made without departing from the spirit of the described principles. Accordingly, the patent protection accorded to these principles is limited only by the following claims.

The invention claimed is:

1. A combustion chamber construction for an opposed-piston engine including at least one cylinder with a bore and longitudinally-separated exhaust and intake ports formed therein and a pair of pistons disposed in opposition to one another in a bore of the cylinder, in which:

the pistons have shaped end surfaces that form a combustion chamber having an injection axis, dual mixing regions disposed along the injection axis, a narrowed coupling region aligned with the injection axis and disposed between the mixing regions through which the mixing regions communicate, wherein the combustion chamber has the shape of a peanut shell with a longitudinal disposition along the injection axis, when viewed along a longitudinal axis of the cylinder, and injection ports are located on the injection axis through which fuel is injected into the mixing regions; and, the cylinder includes a pair of opposed fuel injector ports with which the injection ports of the combustion chamber align when the pistons are near the respective top center positions.

2. The combustion chamber construction of claim 1, in which each end surface includes a circumferential, peripheral edge, an annular surface inside the peripheral edge, a recessed combustion chamber region running diametrically within the annular surface, and a ridge bordering the recessed combustion chamber region, in which the ridge protrudes from the end surface and includes a central portion that curves away from the peripheral edge and transitions to respective flanking portions that curve toward the peripheral edge.

3. The combustion chamber construction of claim 2, in which the flanking portions of the ridges define the mixing regions as bulbous volumes and the central portions of the ridges define a waist volume in the coupling region that is narrower than the bulbous volumes.

4. The combustion chamber construction of claim 3, in which each end surface includes diametrically-opposed notches formed in the annular surface, wherein the notches on the end surface of a first piston align with the notches on the end surface of a second piston to form the pair of injection ports when the first and second pistons are near the respective top center positions.

5. The combustion chamber construction of claim 1, in which the combustion chamber is defined between a bowl in the end surface of a first piston of the pair of pistons and mirrored ridges that protrude from the end surface of a second piston of the pair of pistons, and each ridge includes a central portion that curves away from a periphery of the end surface of the second piston and transitions to respective flanking portions that curve toward the periphery.

6. The combustion chamber construction of claim 5, in which the flanking portions of the ridges define the mixing regions as bulbous volumes and the central portions of the ridges define a waist volume in the coupling region that is narrower than the bulbous volumes.

7. The combustion chamber construction of claim 6, in which each end surface includes a circumferential, peripheral edge, an annular surface running inside the peripheral edge, and diametrically-opposed notches formed in the peripheral surface, wherein the notches on the end surface of the first piston align with the notches on the end surface of the second piston to form the pair of injection ports when the first and second pistons are near the respective top center positions.

8. The combustion chamber construction of claim 1, in which each end surface includes a peripheral edge, an annular surface running inside the peripheral edge, and diametrically-opposed notches formed in the peripheral surface, wherein the notches on the end surface of the first piston align with the notches on the end surface of the second piston to form the pair of injection ports when the first and second pistons are near the respective top center positions.

9. An opposed-piston engine, comprising:

at least one cylinder with longitudinally-separated exhaust and intake ports formed therein;

a pair of pistons disposed in opposition to one another in a bore of the cylinder, each piston operable to move from a respective bottom center position to a respective top center position in the bore during a compression stroke, in which:

the pistons have shaped end surfaces that form a combustion chamber having an injection axis, dual mixing regions disposed along the injection axis, a narrower coupling region aligned with the injection axis and disposed between the mixing regions through which the mixing regions communicate, wherein the combustion chamber has the shape of a peanut shell with a longitudinal disposition along the injection axis, when viewed along a longitudinal axis of the cylinder, and injection ports are located on the injection axis through which fuel is injected into the mixing regions; and, the cylinder includes a pair of diametrically opposed fuel injector ports with which the injection ports of the combustion chamber align when the first and second pistons are near the respective top center positions.

10. The opposed-piston engine of claim 9, in which each end surface includes a circumferential, peripheral edge, an annular surface inside the peripheral edge, a recessed combustion chamber region running diametrically within the annular surface, and a ridge bordering the recessed combustion chamber region, in which the ridge protrudes from the end surface and includes a central portion that curves away from the peripheral edge and transitions to respective flanking portions that curve toward the peripheral edge.

11. The opposed-piston engine of claim 10, in which the flanking portions of the ridges define the mixing regions as bulbous volumes and the central portions of the ridges define a waist volume in the coupling region that is narrower than the bulbous volumes.

12. The opposed-piston engine of claim 11, in which each end surface includes diametrically-opposed notches formed in the annular surface, wherein the notches on the end surface of a first piston align with the notches on the end surface of a second piston to form the pair of injection ports when the first and second pistons are near the respective top center top center positions.

13. The opposed-piston engine of claim 9, in which the combustion chamber is defined between a bowl in the end surface of a first piston of the pair of pistons and mirrored ridges that protrude from the end surface of a second piston of the pair of pistons, and each ridge includes a central portion that curves away from a periphery of the end surface of the second piston and transitions to respective flanking portions that curve toward the periphery.

14. The opposed-piston engine of claim 13, in which the flanking portions of the ridges define the mixing regions as bulbous volumes and the central portions of the ridges define a waist volume in the coupling region that is narrower than the bulbous volumes.

15. The opposed-piston engine of claim 14, in which each end surface includes a circumferential, peripheral edge, an annular surface running inside the peripheral edge, and diametrically-opposed notches formed in the peripheral surface, wherein the notches on the end surface of the first piston align with the notches on the end surface of the second piston to form the pair of injection ports when the first and second pistons are near the respective top center top center positions.

16. The opposed-piston engine of claim 9, in which each end surface includes a peripheral edge, an annular surface running inside the peripheral edge, and diametrically-opposed notches formed in the peripheral surface, wherein the notches on the end surface of the first piston align with the notches on the end surface of the second piston to form the pair of injection ports when the first and second pistons are near the respective top center top center positions.

17. A method for operating an opposed-piston engine including a cylinder, a pair of opposed pistons in the bore of the cylinder and spaced-apart intake and exhaust ports controlled by the pistons, by:

introducing swirling charge air into the cylinder between the pistons;

moving the pistons toward each other in a compression stroke;

forming a combustion chamber having an injection axis, bulbous mixing regions disposed along the injection axis, a narrower coupling region aligned with the injection axis and disposed between the mixing regions through which the mixing regions communicate, and injection ports located on the injection axis through which fuel is injected into the mixing regions, wherein the combustion chamber has the shape of a peanut shell with a longitudinal disposition along the injection axis, when viewed along a longitudinal axis of the cylinder;

generating squish flows into the mixing regions as the pistons move toward respective top center positions in the bore; and, injecting fuel into the mixing regions.

18. The method of claim 17, in which injecting fuel into the combustion chamber includes injecting opposing sprays of fuel along the injection axis.

19. The method of claim 18, in which injecting fuel into the combustion chamber further includes injecting a first spray of fuel into a first mixing region through a first injection port and injecting a second spray of fuel into a second mixing region through a second injection port.

20. The method of claim 19, further including generating opposing inward squish flows of charge air as the combustion chamber is formed, and igniting the fuel in response to compression of charge air in the combustion chamber.

* * * * *